United States Patent
Kim et al.

(10) Patent No.: US 11,640,025 B2
(45) Date of Patent: May 2, 2023

(54) DISPLAY DEVICE HAVING A PRIVATE MODE AND A SHARING MODE

(71) Applicant: LG Display Co., Ltd., Seoul (KR)

(72) Inventors: Yunsang Kim, Paju-si (KR); Yongkun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/556,239

(22) Filed: Dec. 20, 2021

(65) Prior Publication Data
US 2023/0101373 A1    Mar. 30, 2023

(30) Foreign Application Priority Data
Sep. 29, 2021  (KR) .................. 10-2021-0128552

(51) Int. Cl.
*F21V 8/00*  (2006.01)

(52) U.S. Cl.
CPC ......... *G02B 6/0076* (2013.01); *G02B 6/0036* (2013.01); *G02B 6/0043* (2013.01); *G02B 6/0068* (2013.01)

(58) Field of Classification Search
CPC .. G02B 6/0036; G02B 6/0043; G02B 6/0068; G02B 6/0076
See application file for complete search history.

(56) References Cited

U.S. PATENT DOCUMENTS

| | | | |
|---|---|---|---|
| 10,705,283 B2 * | 7/2020 | Liu | ............... G02B 6/0053 |
| 11,150,399 B2 | 10/2021 | Liao et al. | |
| 2006/0109686 A1 | 5/2006 | Sugiura | |
| 2014/0043377 A1 | 2/2014 | Tanaka et al. | |
| 2017/0069236 A1* | 3/2017 | Klippstein | ........... G09G 3/3406 |
| 2020/0005718 A1* | 1/2020 | Fattal | ................... G09G 3/3406 |
| 2020/0064535 A1 | 2/2020 | Haan et al. | |
| 2020/0183073 A1 | 6/2020 | Osumi et al. | |
| 2021/0191027 A1 | 6/2021 | Liao et al. | |

(Continued)

FOREIGN PATENT DOCUMENTS

| | | |
|---|---|---|
| CN | 113156570 A | 7/2021 |
| KR | 10-2015-0062758 A | 6/2015 |
| KR | 10-2019-0116435 A | 10/2019 |

(Continued)

OTHER PUBLICATIONS

European Patent Office, Extended European Search Report, EP Patent Application No. 21215874.5, dated Jun. 29, 2022, ten pages.

(Continued)

*Primary Examiner* — Keith G. Delahoussaye
(74) *Attorney, Agent, or Firm* — Fenwick & West LLP

(57) ABSTRACT

A display device includes a display panel configured to display an image, a first backlight unit that is disposed under the display panel and outputs first light, and a second backlight unit that is positioned between the display panel and the first backlight unit and outputs second light, wherein the first backlight unit includes a first light guide plate having first patterns protruding or recessed from a rear surface of the first light guide plate, the second backlight unit includes a second light guide plate having second patterns protruding from a rear surface of the second light guide plate, and the second patterns have an asymmetric pyramid shape.

15 Claims, 9 Drawing Sheets

(56) References Cited

U.S. PATENT DOCUMENTS

2021/0390914 A1* 12/2021 Fattal ................ G02F 1/133615

FOREIGN PATENT DOCUMENTS

| TW | M595237 U | 5/2020 |
|----|-----------|--------|
| WO | WO 2006/109921 A1 | 10/2006 |
| WO | WO 2010/055907 A1 | 5/2010 |
| WO | WO 2017/065745 A1 | 4/2017 |

OTHER PUBLICATIONS

Taiwan Intellectual Property Office, Office Action, TW Patent Application No. 110149324, dated Dec. 20, 2022, 11 pages.

* cited by examiner

<first mode>

<second mode>

DISPLAY DEVICE HAVING A PRIVATE MODE AND A SHARING MODE

CROSS REFERENCE TO RELATED APPLICATION

The present application claims priority to Republic of Korea Patent Application No. 10-2021-0128552, filed Sep. 29, 2021, which is hereby incorporated by reference in its entirety.

BACKGROUND

Field of Technology

The present disclosure relates to a display device, and more particularly, to a display device having a limited viewing angle.

Description of the Related Art

As the information society progresses, various types of display devices are being developed. Recently, various display devices such as a liquid crystal display (LCD), a plasma display panel (PDP), and an organic light-emitting display (OLED) have been used.

A typical display device does not limit a viewing angle. However, the limitation of the viewing angle of the display device is recently required for the reasons of privacy and information protection. For example, in the case of a display device used as an information medium inside a vehicle, a high-definition image is provided to a passenger in a passenger seat, but a viewing angle needs to be limited to a driver for safety in driving.

SUMMARY

Embodiments provide a display device capable of effectively limiting a viewing angle.

The display device according to an embodiment may include a display panel configured to display an image; a first backlight unit disposed under the display panel, the first backlight unit configured to output first light and includes a first light guide plate, the first light guide plate comprising first patterns protruding or recessed from a rear surface of the first light guide plate; and a second backlight unit positioned between the display panel and the first backlight unit, the second backlight unit configured to output second light and includes a second light guide plate, the second light guide plate comprising second patterns protruding from a rear surface of the second light guide plate, the second patterns have an asymmetric pyramid shape.

In one embodiment, a display device that is provided in a vehicle comprises a display panel configured to display an image; a first backlight unit including a first light source package disposed under the display panel and a first light guide plate disposed on one side of the first light source package, the first backlight unit configured to generate first light and; and a second backlight unit including a second light source package positioned between the display panel and the first backlight unit and a second light guide plate disposed at one side of the second light source package, the second backlight unit configured to generate second light, wherein the second light guide plate includes second patterns protruding from a rear surface of the second light guide plate, the second patterns having an asymmetric pyramid shape.

In one embodiment, a display device comprises: a display panel configured to display an image; a first backlight unit under the display panel, the first backlight unit configured to output first light to the display panel; and a second backlight unit disposed between the display panel and the first backlight unit such that the display panel, the first backlight unit, and the second backlight unit overlap, wherein during a first mode of the display device the first backlight unit is enabled and the second backlight unit is disabled such that the image is displayed with a first side viewing angle, and wherein during a second mode of the display device the first backlight unit is enabled and the second backlight unit is enabled such that the image is displayed with a second side viewing angle that is greater than the first side viewing angle.

DETAILED DESCRIPTION

Figure 1:
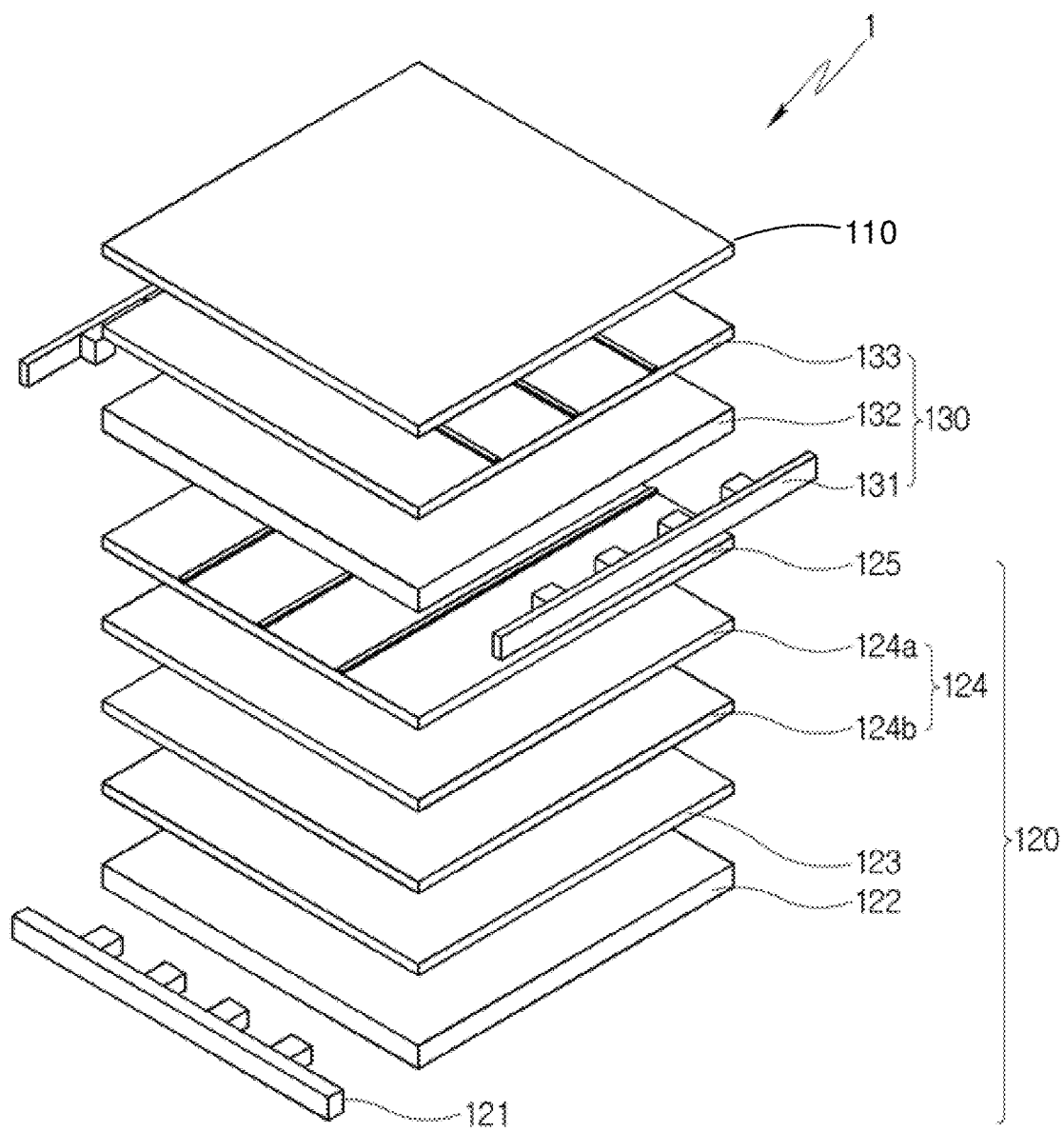
FIG. 1 is an exploded perspective view of a display device according to an embodiment.

Hereinafter, embodiments will be described with reference to the drawings. In this specification, when a component (or region, layer, portion, etc.) is referred to as "on," "connected to," or "coupled to," another component, it means that the component can be directly connected/coupled to the other component or that a third component can be placed between them.

Like reference numerals refer to like elements. In addition, in the drawings, thicknesses, ratios, and dimensions of components are exaggerated for an effective description of technical content. In addition, "and/or" includes any combination of one or more that the associated configurations may define.

Terms such as first, second, etc. may be used to describe various elements, but the elements are not limited by the terms. The above terms are used only for the purpose of distinguishing one component from another component. For example, without departing from the scope of the present embodiments, a first component may be referred to as a second component, and similarly, the second component may also be referred to as the first component. The singular expression includes the plural expression unless the context clearly dictates otherwise.

Terms such as "lower", "below", "above", "upper" and the like are used to describe the relationship of the components shown in the drawings. The above terms are relative concepts, and are described with reference to directions indicated in the drawings.

The term such as "comprise" or "have" is intended to designate that there is a feature, number, step, operation, component, part, or a combination thereof described in the specification, but it should not be understood that it precludes the possibility of the existence or addition of one or more other features or number, step, operation, component, part or combinations thereof.

Figure 2:
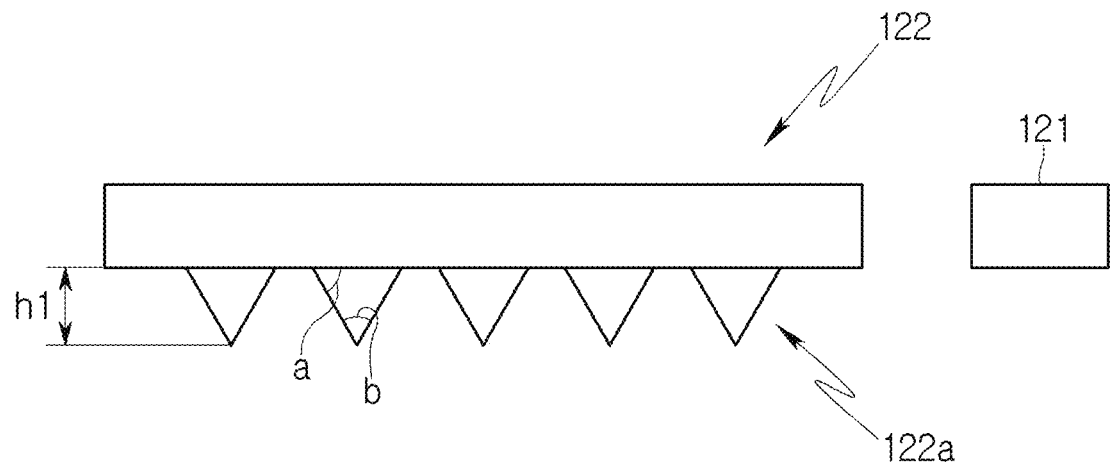
FIG. 2 is a cross-sectional view schematically illustrating the structure of the first light guide plate shown in FIG. 1 according to an embodiment.
Figure 3:
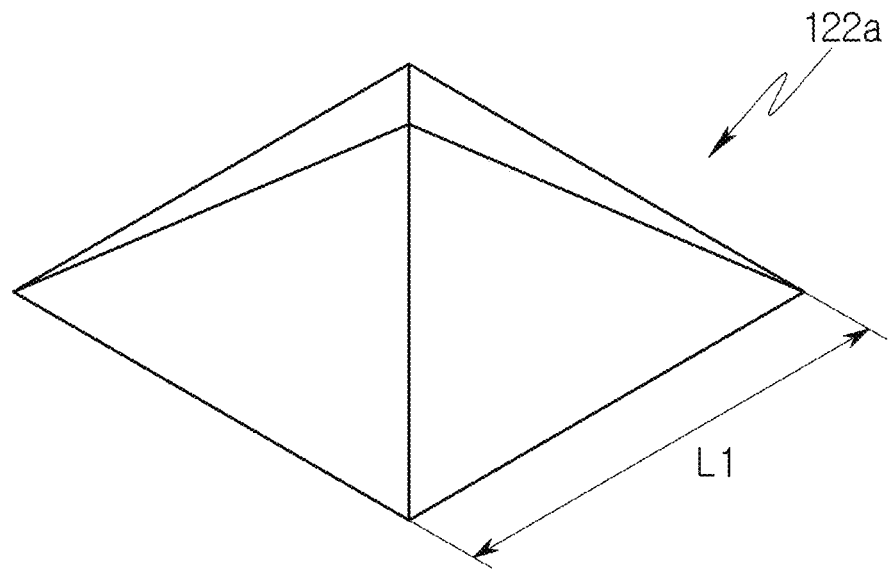
FIG. 3 is a view schematically illustrating a pattern formed on a lower surface of the first light guide plate according to an embodiment.
Figure 4:
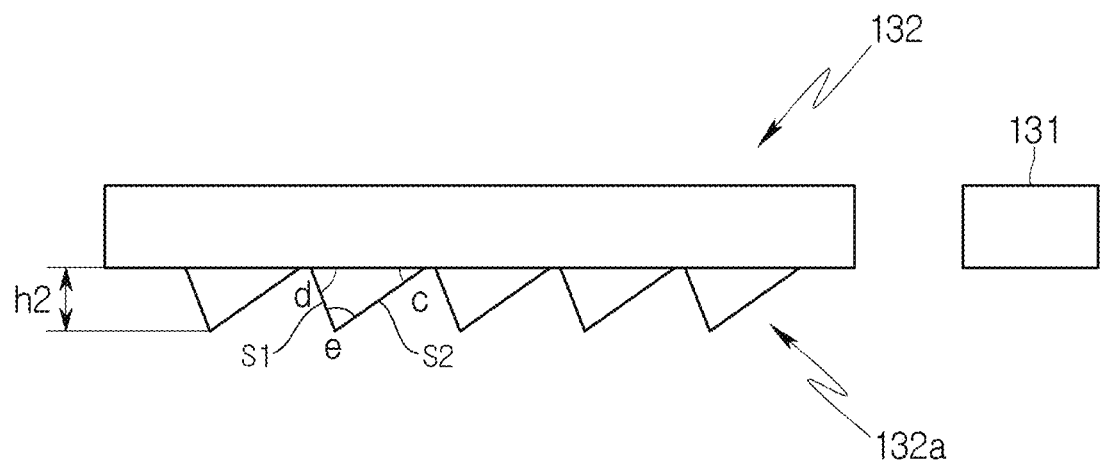
FIG. 4 is a cross-sectional view schematically illustrating the structure of the second light guide plate shown in FIG. 1 according to an embodiment.
Figure 5:
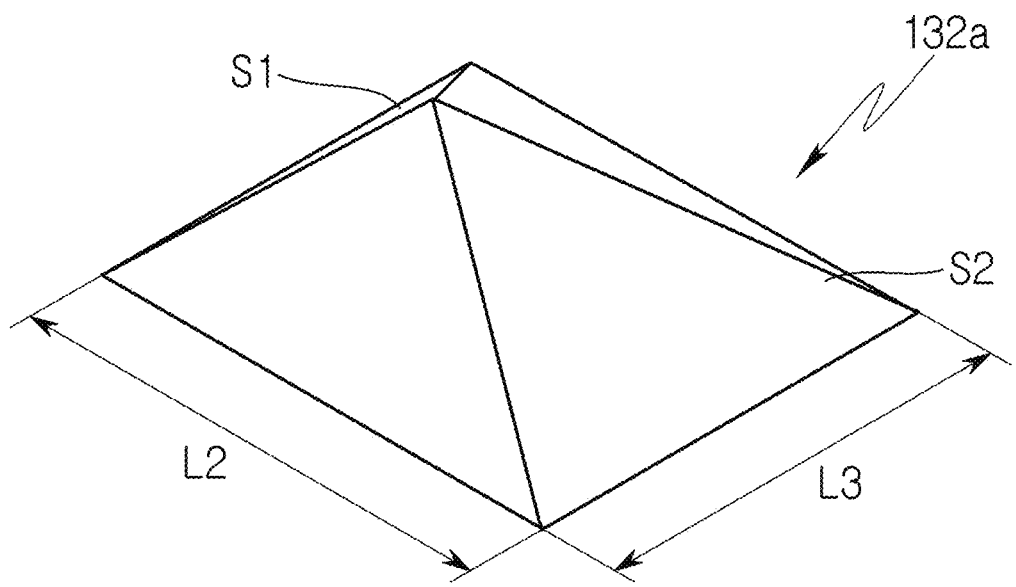
FIGS. 5 and 6 are views schematically illustrating a pattern formed on a lower surface of the second light guide plate according to an embodiment.
Figure 6:
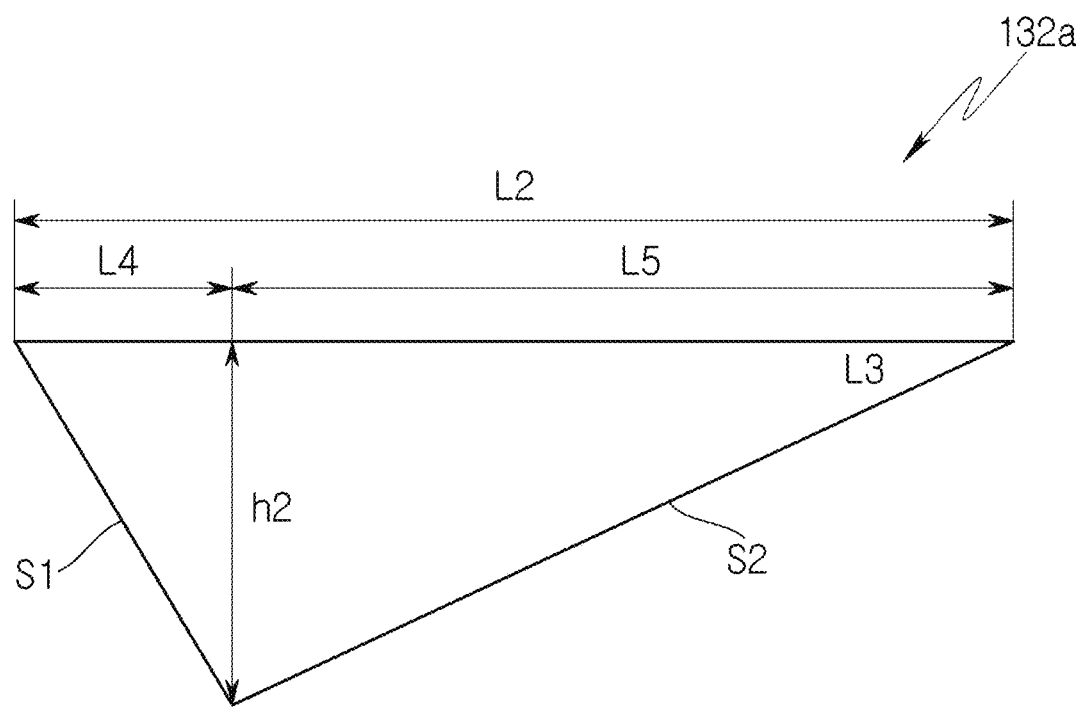

FIG. 1 is an exploded perspective view of a display device according to an embodiment. FIG. 2 is a cross-sectional view schematically illustrating the structure of the first light guide plate shown in FIG. 1 according to an embodiment, and FIG. 3 is a view schematically illustrating a pattern formed on a lower surface of the first light guide plate according to an embodiment. FIG. 4 is a cross-sectional view schematically illustrating the structure of the second light guide plate shown in FIG. 1 according to an embodiment, and FIGS. 5 and 6 are views schematically illustrating a pattern formed on a lower surface of the second light guide plate according to an embodiment.

Referring to FIG. 1, a display device 1 according to an embodiment may include a display panel 110 that displays an image including pixels, and first and second backlight units 120, 130 that are disposed on a rear surface of the display panel 110 to emit light toward the front of the display panel 110. As shown in FIG. 1, the display panel 110, the first backlight unit 120, and the second backlight unit 130 overlap each other. Although not shown, the display device 1 may further include a panel guide for receiving and fixing the display panel 110 and the first and second backlight units 120, 130, a top case, a bottom cover, and the like.

The display panel 110 is a liquid crystal panel, and may include a lower substrate and an upper substrate bonded to face each other, and a liquid crystal layer interposed between the substrates.

The lower substrate may include gate lines and data lines arranged to cross each other, and liquid crystal cells formed in an area where the gate lines and data lines cross each other. In an embodiment, the liquid crystal cells may be arranged in a matrix form on the lower substrate. The liquid crystal cells may include a thin film transistor disposed at an intersection region of the gate lines and the data lines, and a pixel electrode receiving a data voltage applied to the data lines through the thin film transistor when the thin film transistor is turned on.

Color filters for implementing a plurality of colors including red, green, and blue, and a black matrix for partitioning between the color filters and blocking the light passing through the liquid crystal layer and a common electrode for applying a voltage to the liquid crystal layer may be formed on the upper substrate.

The common electrode may be formed on the upper substrate in a vertical electric field driving type such as a twisted nematic (TN) mode and a vertical alignment (VA) mode, and may be formed on the lower substrate together with the pixel electrode in a horizontal electric field driving type such as an in-plane switching (IPS) mode and a fringe field switching (FFS) mode.

The liquid crystal cells are driven according to an electric field generated by a potential difference between the data voltage supplied to the pixel electrode through the data lines and the common voltage supplied to the common electrode to adjust the amount of light transmitted from the display panel 110.

The first and second backlight units 120, 130 are disposed under the display panel 110 to provide light to the display panel 110. The first backlight unit 120 may be disposed under the display panel 110, and the second backlight unit 130 may be interposed between the first backlight unit 120 and the display panel 110.

The first backlight unit 120 may include a first light source package 121, a first light guide plate 122, a first diffusion sheet 123, a first prism sheet 124, and a first light control film 125.

The first light source package 121 may be driven by receiving power from outside and generating light. The first light source package 121 may generate light using various light sources such as a cold cathode fluorescent lamp (CCFL), an external electrode fluorescent lamp (EEFL), a hot cathode fluorescent lamp (HCFL), or a light-emitting diode (LED). The first light source package 121 is disposed to face at least one side of the first light guide plate 122. Accordingly, the light emitted from the first light source package 121 may be incident on the side of the first light guide plate 122.

The first light guide plate 122 is disposed to face one side of the first light source package 121 and guides the light incident from the first light source package 121 to emit it to an upper surface. In an embodiment, the first light guide plate 122 is a light-transmitting material, and may be made of, for example, a plastic material such as polymethyl methacrylate (PMMA) or a material selected from polycarbonate (PC) type materials. However, the material of the first light guide plate 122 is not limited to the above, and the first light guide plate 122 may be made of other materials.

Referring to FIGS. 2 and 3, first patterns 122a, each being polygonal and protruding, may be formed on a rear surface of the first light guide plate 122. The first patterns 122a may be embossed on the rear surface of the first light guide plate 122 through injection or printing. In another embodiment, the first patterns 122a may be formed in an intaglio shape recessed in the rear surface of the first light guide plate 122. The first patterns 122a may be disposed by regularly or irregularly spaced apart from each other.

In an embodiment, the first patterns 122a may have a pyramid shape. In this case, the first patterns 122a may have a symmetrical shape in which inclinations of the four sides forming the pyramid are the same or substantially similar. In an embodiment, the length (L1) of one side of the symmetric pyramid may be about 10 μm to 50 μm, for example, about 30 μm. Also, in an embodiment, the angle (a) between the rear surface of the first light guide plate 122 and one side of the symmetric pyramid is about 20° to 60°, for example, about 40°. The vertex angle (b) of the symmetric pyramid may be about 100°. The height (h1) of the symmetric pyramid may be determined according to the size and inclination of the four sides, and may be, for example, 5 μm to 30 μm. However, the present embodiment is not limited thereto.

In another embodiment, the first patterns 122a may have a dot shape. In one embodiment, the diameter of the dot may be about 40 μm to 100 μm, and the depth of the dot may be about 2 μm to 30 μm. However, the present embodiment is not limited thereto.

An emission angle of the light incident from the first light source package 121 to the first light guide plate 122 may be controlled by the first patterns 122a formed on the rear surface. Since the first patterns 122a have a symmetric pyramid shape or a dot shape, the light refracted on four sides or curved surfaces of the first pattern 122a may be partially emitted in the lateral direction as well as the upper surface of the first light guide plate 122.

The first diffusion sheet 123 and the first prism sheet 124 are disposed on the first light guide plate 122. The first diffusion sheet 123 diffuses the light emitted from the first light guide plate 122 to improve luminance uniformity according to the viewing angle. The first diffusion sheet 123 may be formed of PET or polycarbonate (PC) resin, and may include a particle coating layer serving as diffusion. The first prism sheet 124 condenses the light so that the traveling direction of the light emitted from the first light guide plate 122 or the first diffusion sheet 123 approaches the normal direction of the display panel 110, and thus the front luminance of the display panel 110 is improved. In one embodiment, the first prism sheet 124 may include a first upper prism sheet 124a and a first lower prism sheet 124b in which a prism pattern is formed and axes of the prism pattern are arranged orthogonally to each other.

The first light control film (LCF) 125 is disposed on the first prism sheet 124. The first light control film 125 may control the profile of the emitting light of the first backlight unit 120 together with the first patterns 122a. For example, the first light control film 125 may adjust the left and right and/or vertical viewing angles of the light emitted from the first backlight unit 120 to be narrow.

The second backlight unit 130 is disposed on the first backlight unit 120. The second backlight unit 130 may include a second light source package 131, a second light guide plate 132, and a second light control film 133.

The second light source package 131 may be driven by receiving power from outside and generating light. The second light source package 131 generates light using various light sources such as a cold cathode fluorescent lamp (CCFL), an external electrode fluorescent lamp (EEFL), a hot cathode fluorescent lamp (HCFL) o a light-emitting diode (LED). The second light source package 131 is disposed to face at least one side of the second light guide plate 132. Accordingly, the light emitted from the second light source package 131 may be incident on the side of the second light guide plate 132.

In an embodiment, the second light source package 131 may be disposed on a different side from the first light source package 121. For example, when the first light source package 121 is disposed on the first side of the display device 1, the second light source package 131 may be disposed on at least one of the second to fourth sides of the display device 1. For example, the second light source package 131 may be disposed on the left/right side, only on the left side, or only on the right side of the display device 1. In addition, the number of the second light source packages 131 may be the same as or different from the number of the first light source packages 121. For example, when one first light source package 121 is provided as illustrated, two or more second light source packages 131 may be provided. In this embodiment, two or more second light source packages 131 may be disposed to face each other with the second light guide plate 132 interposed therebetween, but the present embodiment is not limited thereto.

The second light guide plate 132 is disposed to face the second light source package 131, and guides the light incident from the second light source package 131 to emit the light to the upper surface. In an embodiment, the second light guide plate 132 is a light-transmitting material and may be made of, for example, a plastic material such as polymethyl methacrylate (PMMA) or a material selected from polycarbonate (PC) type materials.

Referring to FIGS. 4 and 5, second patterns 132a, each being polygonal and protruding, may be formed on the rear surface of the second light guide plate 132. The second patterns 132a may be embossed on the rear surface of the second light guide plate 132 through injection or printing. The second patterns 132a may be disposed of by regularly or irregularly spaced apart from each other.

In an embodiment, the second patterns 132a may have a pyramid shape. In this case, the second patterns 132a may have an asymmetric shape in which at least some of the inclinations of the four sides forming the pyramid have different angles. In this embodiment, in the second patterns 132a, the inclination of the first side S1 distant from the second light source package 131 may be steeper than the inclination of the second side S2 close to the second light source package 131.

That is, the angle (d) between the first side S1 distant from the second light source package 131 of the second patterns 132a and the rear surface of the second light guide plate 132 is greater than the angle (c) between the second side S2 close to the light source package 131 of the second patterns 132a and the rear surface of the second light guide plate 132. In this case, if the inclination is steep, the acute angle between the normal of the corresponding side (here, the first side S1) and the rear surface of the second light source package 131 may be less than 45 degrees (generally horizontal). Conversely, if the inclination is gentle, the acute angle between the normal of the corresponding side (here, the second side S2) and the rear surface of the second light source package 131 may be greater than 45 degrees (generally vertical).

In one embodiment, the length of one side of the asymmetric pyramid may be about 20 μm to 100 μm, for example, a long side length (L2) may be about 50 μm, and a short side length (L3) may be about 30 μm. Also, in an embodiment, the angles (c, d) between the rear surface of the second light guide plate 132 and the four sides of the asymmetric pyramid are about 20° to 60°, for example, about 50° to 60°. The apex angle (e) of the asymmetric pyramid may be about 60° to 80°. The height (h2) of the asymmetric pyramid may be determined according to the size and inclinations of the four sides, and may be, for example, 5 μm to 30 μm. However, the present embodiment is not limited thereto.

Referring to FIG. 6, the ratio of the length (L2) of the long side to the height (h2) of the second patterns 132a may be set in a range of about 0.5 to 20. For example, the ratio of the length (L2) to height (h2) of the long side of the second patterns 132a may be set to 100:14.2. In addition, the ratio of the distance (L4) to one short side and the distance (L5) to the other short side, from perpendicular foot down from the vertex to bottom of the second patterns 132a, may be set to about 0.4. As an example, the ratio of the distance (L4) to one short side and the distance (L5) to the other short side, from the perpendicular foot down from the vertex to bottom of the second patterns 132a may be about 1:9 to 5:5, preferably 3:7. However, the present embodiment is not limited thereto.

The second light control film 133 is disposed on the second light guide plate 132. The second light control film 133 may control the profile of emitted light of the second backlight unit 130 together with the second patterns 132a. For example, the second light control film 133 may adjust the left and right and/or vertical viewing angles of the light emitted from the second backlight unit 130 to be narrow angles. In various embodiments, an optical film such as a UV blocking film (LAF) may be further provided or may be omitted.

Hereinafter, a specific embodiment in which the side viewing angle of the display device 1 is controlled through the backlight units 120, 130 having the above structure will be described.

Figure 7:
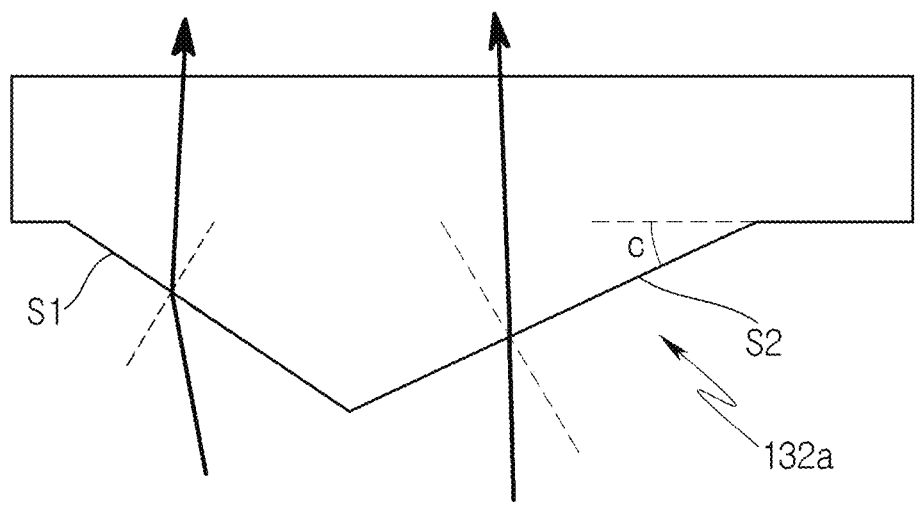
FIG. 7 is a view schematically illustrating a path of light passing through a first light guide plate in a first mode of a display device according to an embodiment.
Figure 7:
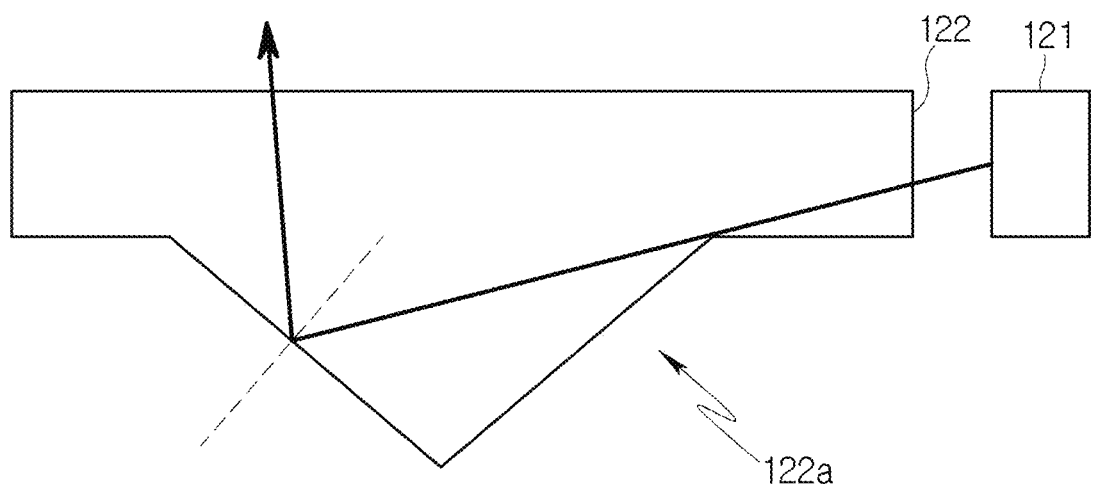
Figure 8:
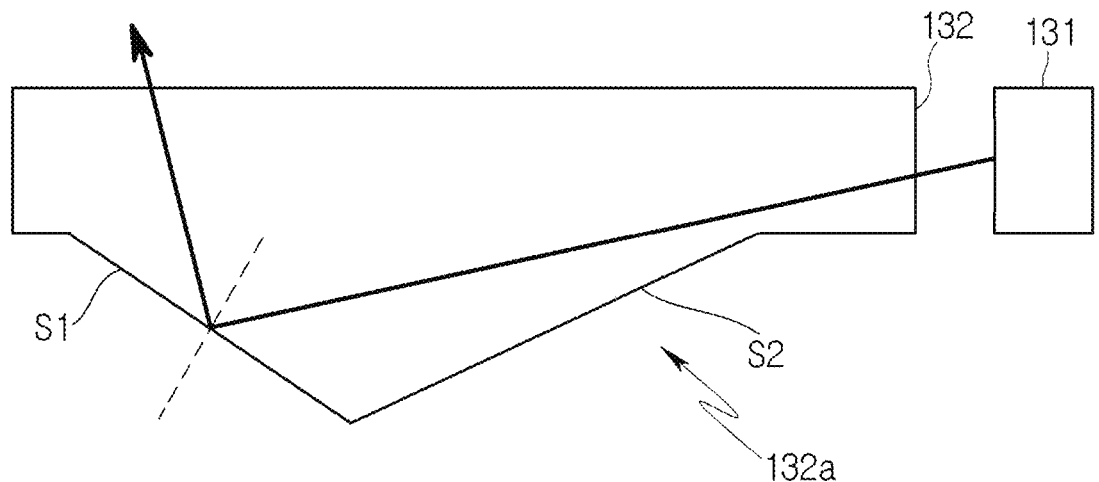
FIG. 8 is a view schematically illustrating a path of light passing through a second light guide plate in a second mode of a display device according to an embodiment.
Figure 8:
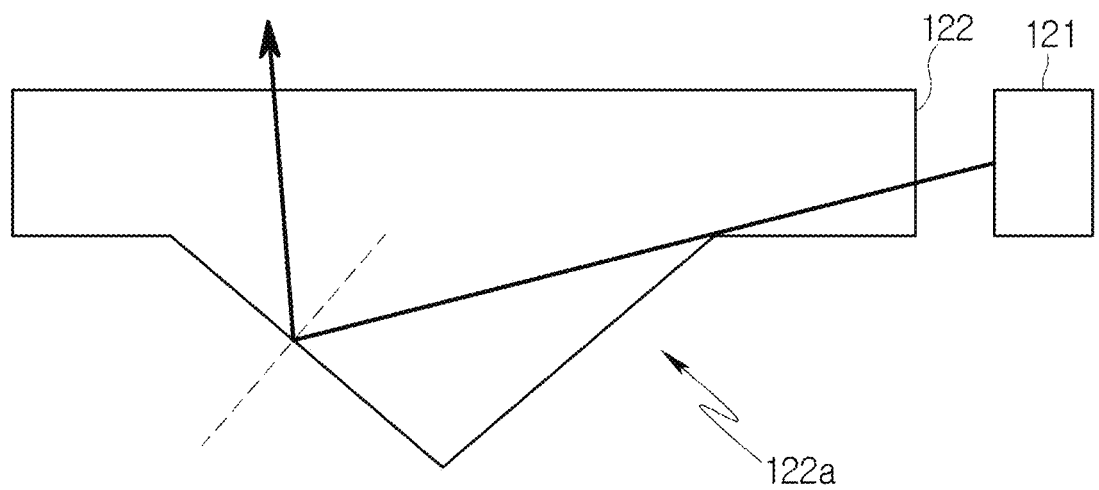
Figure 9:
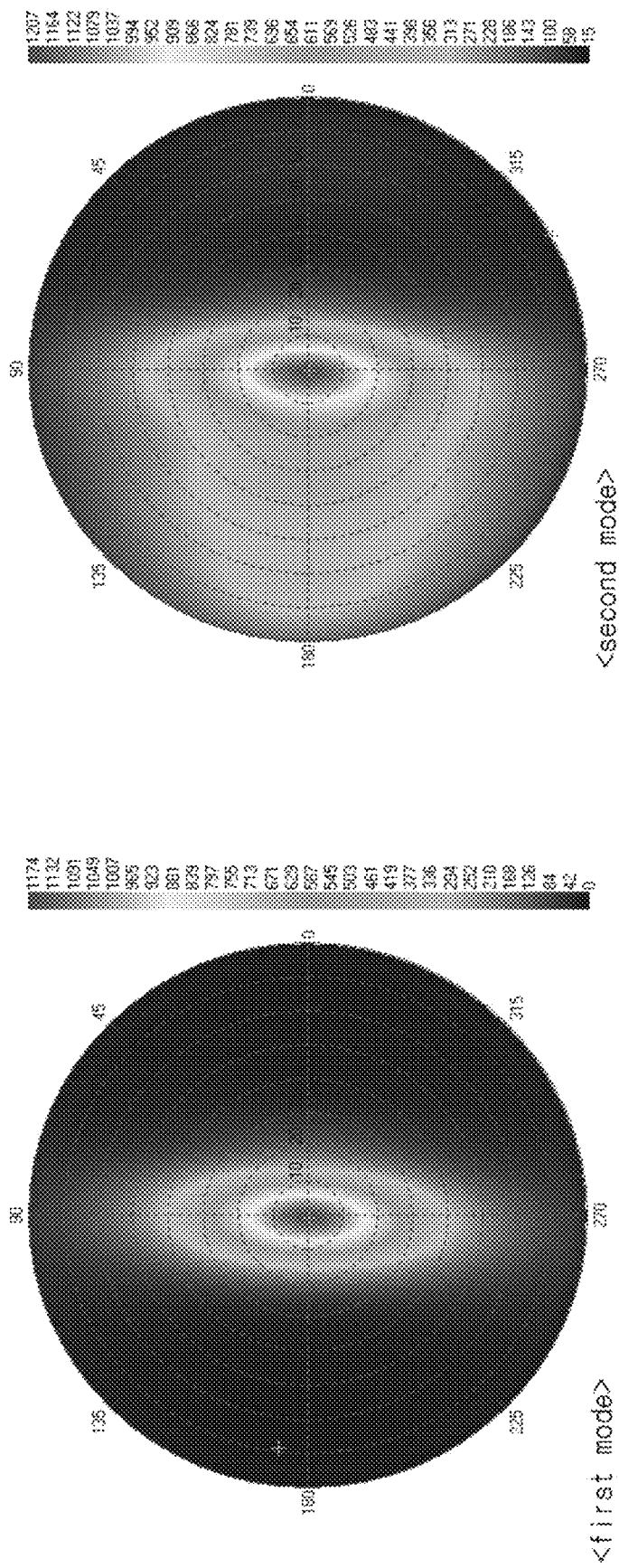
FIG. 9 is a simulation result obtained by measuring luminance distribution in a first mode and a second mode of a display device according to an embodiment.
Figure 10:
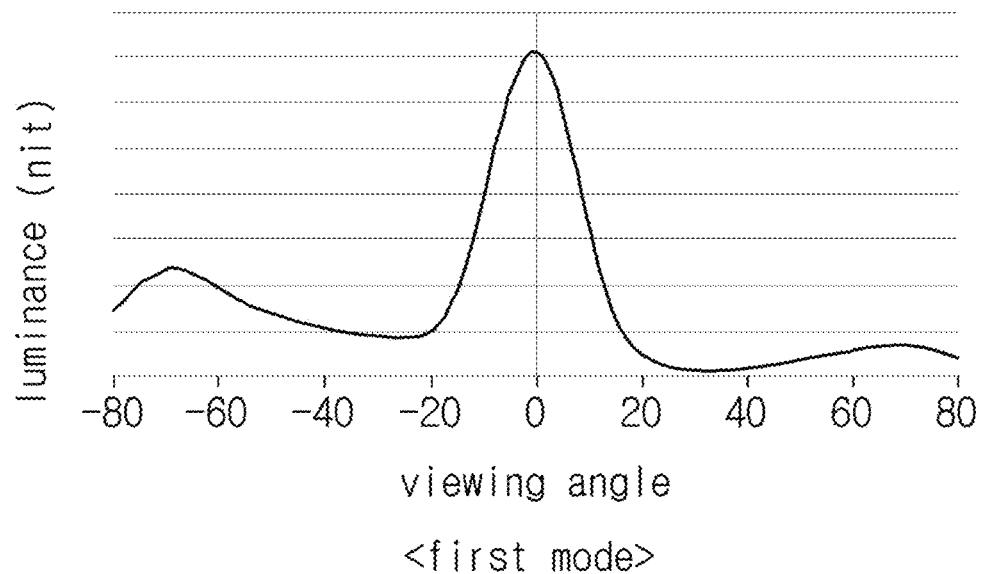
FIG. 10 is a graph showing luminance distribution in a first mode and a second mode of a display device according to an embodiment.
Figure 10:
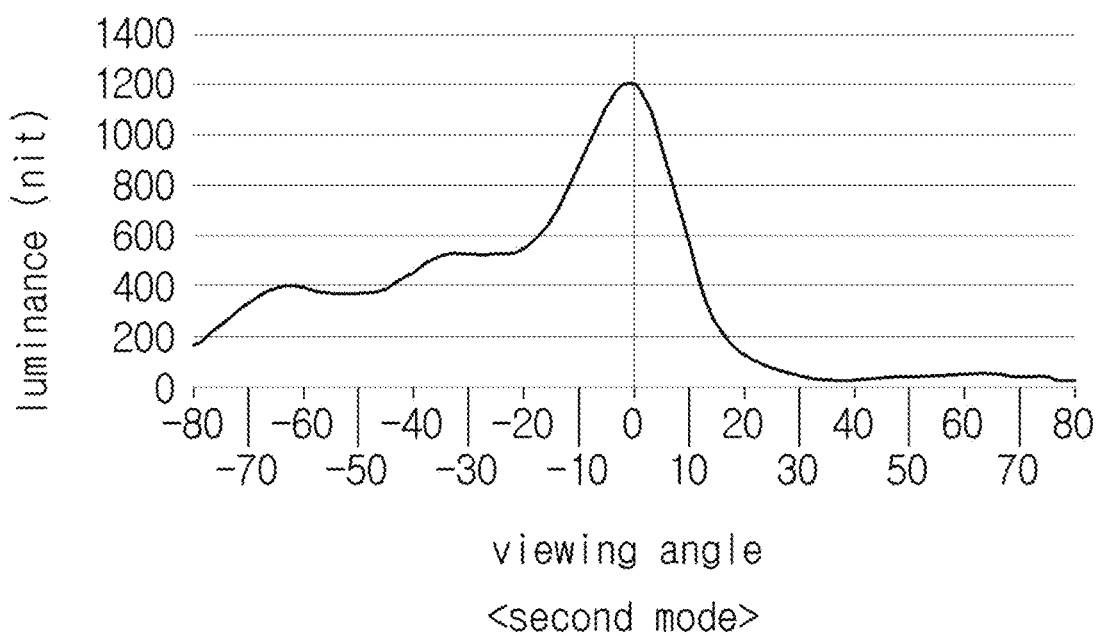

FIG. 7 is a view schematically illustrating a path of light passing through a first light guide plate 122 in a first mode of the display device 1 according to an embodiment, and FIG. 8 is a view schematically illustrating a path of light passing through a second light guide plate 132 in a second mode of the display device 1 according to an embodiment. FIG. 9 is a simulation result obtained by measuring luminance distribution in a first mode and a second mode of a display device according to an embodiment, and FIG. 10 is a graph showing luminance distribution in a first mode and a second mode of a display device according to an embodiment.

The display device 1 according to an embodiment may operate in any one of a first mode and a second mode. For example, the first mode is a private mode, and may be a mode for limiting a side viewing angle of the display device 1. Also, the second mode is a sharing mode and may be a mode that does not limit the side viewing angle of the display device 1. Thus, the sharing mode has a larger viewing angle than the private mode.

Referring to FIG. 1 together, in the private mode, the first light source package 121 of the first backlight unit 120 is turned on, and the second light source package 131 of the second backlight unit 130 is turned off. Thus, in the private mode the first backlight unit 120 is enabled and the second backlight unit 130 is disabled.

Referring to FIG. 7, the emission angle of the light emitted from the first light source package 121 is controlled by the first patterns 122a formed on the rear surface of the first light guide plate 122, and the light is emitted to the upper surface of the first light guide plate 122. The light emitted to the upper surface of the first light guide plate 122 passes through the first diffusion sheet 123, the first prism sheet 124, and the first light control film 125 and is incident on the rear surface of the second backlight unit 130.

The emission angle of the light incident on the rear surface of the second backlight unit 130 is controlled by the second patterns 132a formed on the rear surface of the second light guide plate 132. Since the second patterns 132a have an asymmetric pyramid shape, the light incident on the second light guide plate 132 may be controlled to be emitted to the upper surface of the second light guide plate 132 at a narrow angle or may be controlled to be emitted in the lateral direction.

For example, when the second light source package 131 is turned off, the light emitted from the first backlight unit 120 may be incident on the second light guide plate 132. The light incident on the rear surface of the second light guide plate 132 may be refracted on the inclined surfaces of the second patterns 132a and then emitted upward. In particular, the light incident on the rear surface of the second light guide plate 132 has an emission angle further limited to a narrow angle by the gently inclined surfaces of the second patterns 132a.

More specifically, the light incident on the rear surface of the second light guide plate 132 reaches more than the second side S2 thereof, which is a relatively large area in the second patterns 132a. Since the normal of the second side S2 has an angle greater than 45 degrees (generally perpendicular) with respect to the rear surface of the second light guide plate 132, the light incident on the rear surface proceeds generally vertically with respect to the rear surface according to the normal direction of the second side S2. That is, the light incident on the rear surface is emitted substantially perpendicular to the rear surface (or upper surface) of the second light guide plate 132. As a result, for the light incident on the rear surface, the emission in the lateral direction is limited, and the emission angle is limited only in a direction substantially perpendicular to the upper surface of the second light guide plate 132, so that the emission angle is limited to a narrow angle.

As such, when the emission angle is controlled to be narrow by the second patterns 132a, the viewing angle from the side of the display device 1 is limited, and the display device 1 may operate in the first mode, that is, in the private mode.

The light emitted from the second backlight unit 130 is applied to the display panel 110, and an image is an output in an upper direction of the display device 1 through the pixels disposed on the display panel 110. Since the emission angle of the light emitted from the second backlight unit 130 is limited in the upper direction, the image output through the display panel 110 has high luminance in the front direction as shown in FIGS. 9 and 10, and the image display is limited in the lateral direction. As such, since the side viewing angle of the display panel 110 is controlled in the private mode, an image may not be viewed by a user who looks at the display panel 110 from the side of the display panel 110.

In the sharing mode, the first light source package 121 of the first backlight unit 120 is turned on, and the second light source package 131 of the second backlight unit 130 is also turned on. Thus, in the sharing mode the first backlight unit 120 is enabled and the second backlight unit 130 is also enabled.

Referring to FIG. 8, the light emitted from the first light source package 121 has an emission angle controlled by the first patterns 122a formed on the rear surface of the first light guide plate 122, and the light is emitted to the upper surface of the first light guide plate 122. The light emitted to the upper surface of the first light guide plate 122 passes through the first diffusion sheet 123, the first prism sheet 124, and the first light control film 125, and then is incident on the rear surface of the second backlight unit 130.

As described with reference to FIG. 7, an emission angle of the light incident on the rear surface of the second backlight unit 130 is controlled by the second patterns 132a formed on the rear surface of the second light guide plate 132. The light incident on the rear surface of the second backlight unit 130 may be restricted from being emitted in the lateral direction by the gently inclined surface of the second patterns 132a, and may be emitted only in the upper direction of the narrow angle.

In the share mode, since the second light source package 131 is turned on, the light emitted from the second light source package 131 is further incident on the side surface of the second light guide plate 132. This light incident in the lateral direction of the second light guide plate 132 is refracted at the first side S1 of the second patterns 132a, and at least a portion of the light is emitted laterally, and the viewing angle at the side surface of the display device 1 may be increased.

More specifically, the light incident in the lateral direction of the second light guide plate 132 reaches the first side S1 of the second patterns 132a disposed opposite to each other.

Since the normal of the first side S1 has an angle (generally horizontal) less than 45° with respect to the rear surface of the second light guide plate 132, the sidelight incident adjacent to the normal of the first side S1 is emitted adjacent to the normal of the first side S1 again.

Since the normal of the first side S1 has an angle less than 45 degrees (generally horizontal) with respect to the rear surface of the second light guide plate 132, the light incident on the side surface proceeds generally horizontally with respect to the rear surface according to the normal direction of the first side S1. That is, the light incident on the side surface is emitted in the lateral direction with respect to the rear surface (or the upper surface) of the second light guide plate 132. As a result, the light incident on the side surface is allowed to be emitted in the lateral direction, and the emission angle is increased to a wide angle.

As described above, when the emission angle is controlled to be wide by the second patterns 132a, the display device 1 may operate in the second mode, that is, the share mode. In the share mode, the range of the emission angle may be 0 to 88°, but is not limited thereto.

The light emitted from the second backlight unit 130 is applied to the display panel 110, and an image is an output in the upper direction of the display device 1 through the pixels disposed on the display panel 110. Since the light emitted from the second backlight unit 130 is transmitted in the upper direction and the lateral direction, an image output through the display panel 110 has high illuminance not only in the front direction but also in the lateral direction as shown in FIGS. 9 and 10. As described above, since the side viewing angle of the display panel 110 is opened in the share mode, an image may be viewed by a user who looks at the display panel 110 from the side of the display panel 110.

In the above, an embodiment in which the first backlight unit 120 is turned on in the first mode and the second mode and the second backlight unit 130 is turned on in the second mode has been described. However, the present invention is not limited thereto. For example, in other embodiments, the first backlight unit 120 may be turned off in at least one of the first modes and the second mode, and the second backlight unit 130 may be turned on in the first mode and turned off in the second mode. In various embodiments, the first backlight unit 120 and the second backlight unit 130 may be controlled in various ways.

Figure 11:
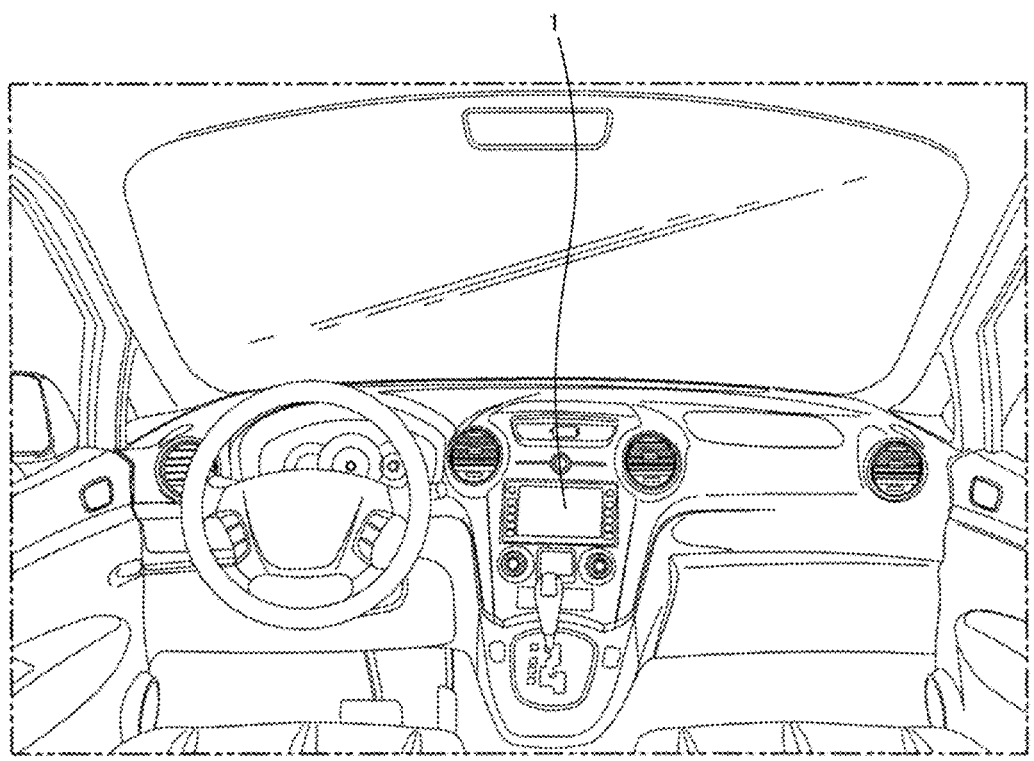
FIG. 11 is a view illustrating an example to which a display device according to an embodiment is applied.

FIG. 11 is a view illustrating an example to which a display device according to an embodiment is applied.

Referring to FIG. 11, the display device 1 according to an embodiment may be provided inside a vehicle. The display device 1 may be provided integrally or detachably on the dashboard of the vehicle.

The display device 1 may display graphical user interfaces (GUIs) corresponding to navigation, video contents, and sound contents according to a driving state and/or a user's request.

In an embodiment, the display device 1 may operate in the private mode while the vehicle is being driven. For example, the display device 1 may operate in the private mode when displaying an image determined to interfere with a user's driving, such as moving image content. In this embodiment, the display device 1 may control the second light source package 131 to be turned off to limit a side viewing angle of the driver seat.

In an embodiment, the display device 1 may operate in the sharing mode while the vehicle is not driving. Alternatively, the display device 1 may operate in the sharing mode even while the vehicle is being driven. For example, the display device 1 may operate in the sharing mode when displaying an image determined to assist the user in driving, such as navigation. In this embodiment, the display device 1 may control the second light source package 131 to be turned on to open a side viewing angle for the driver seat.

The display device according to embodiments may efficiently control a viewing angle by forming an asymmetric pyramidal pattern on a lower surface of a light guide plate of an upper backlight unit in the backlight in which a multi-layer light guide plate is stacked.

The display device according to embodiments may improve cut-off efficiency for limiting a view from a driver seat, and provide a driver seat with a viewing of an image with improved luminance if necessary.

The display device according to embodiments may control the range of a viewing angle and cut-off efficiency by adjusting the size, height, and side angle of a pattern having an asymmetric pyramid shape.

Those of ordinary skill in the art to which the present invention pertains will understand that the present invention may be implemented in other specific forms without changing the technical spirit or essential features thereof. Therefore, it should be understood that the embodiments described above are illustrative in all respects and not restrictive. The scope of the present invention is referred by the claims to be described later rather than the above-detailed description, and it should be interpreted that all changes or modifications derived from the meaning and scope of the claims and their equivalent concepts are included in the scope of the present invention.

What is claimed is:

1. A display device comprising:
    a display panel configured to display an image;
    a first backlight unit disposed under the display panel, the first backlight unit configured to output first light and the first backlight unit includes a first light guide plate and a first light source package configured to generate the first light, the first light guide plate comprising first patterns protruding or recessed from a rear surface of the first light guide plate; and
    a second backlight unit positioned between the display panel and the first backlight unit, the second backlight unit configured to output second light and includes a second light guide plate and a second light source package configured to generate the second light, the second light guide plate comprising second patterns protruding from a rear surface of the second light guide plate, the second patterns have an asymmetric pyramid shape having a first inclined surface and a second inclined surface that is steeper than the first inclined surface,
    wherein the second light source package is disposed adjacent to the first inclined surface of the second patterns,
    wherein during a first mode of the display device the first light source package is turned on to enable the first backlight unit and the second light source package is turned off to disable the second backlight unit such that the first light is emitted at a narrow angle in a front direction of the display panel by the first pattern and the first inclined surface of the second pattern, and
    wherein during a second mode of the display device the first light source package is turned on to enable the first backlight unit and the second light source package is turned on to enable the second backlight unit such that the second light is further emitted to a side by the second inclined surface of the second pattern.

2. The display device according to claim 1,
wherein the second light guide plate is disposed on at least one side of the second light source package, the second light guide plate configured to guide the second light incident from the second light source package to the display panel,
wherein among four sides of the asymmetric pyramid shape of each of the second patterns comprising an angle between a first side distant from the second light source package and the rear surface of the second light guide plate that is greater than an angle between a second side closer to the second light source package and the rear surface of the second light guide plate.

3. The display device according to claim 2,
wherein the first light guide plate is disposed on at least one side of the first light source package and is configured to guide the first light incident from the first light source package to the second backlight unit,
wherein the first patterns have a symmetric pyramid shape or a dot shape.

4. The display device according to claim 3, wherein a side or curved surface of the first patterns is configured to guide the first light emitted from the first light source package to the rear surface of the second light guide plate, and
the first light incident on a lower surface of the second light guide plate is refracted at a second side of the second patterns and is emitted in an upper direction substantially perpendicular to an upper surface of the second light guide plate.

5. The display device according to claim 3, wherein the second light emitted from the second light source package is refracted at a first side of the second patterns, the refracted second light having at least a portion that is laterally emitted with respect to an upper surface of the second light guide plate.

6. The display device according to claim 3, wherein an inclination of four inclined surfaces of each of the second patterns is in a range of angles between 5° to 60°.

7. The display device according to claim 3, wherein a length of a long side of each of the second patterns is in a range between 1 μm to 100 μm and a height of the long side of each of the patterns in in a range between 1 μm to 50 μm.

8. The display device according to claim 3, wherein a ratio of a distance to one short side and a distance to another short side measured from a point that is perpendicular from a vertex to a bottom of each of the second patterns is in a ratio range of 1:9 to 5:5.

9. The display device according to claim 3, wherein the second light source package is disposed on a different side from the first light source package.

10. A display device that is provided in a vehicle, comprising:
a display panel configured to display an image;
a first backlight unit including a first light source package disposed under the display panel and a first light guide plate disposed on one side of the first light source package, the first backlight unit configured to generate first light and; and
a second backlight unit including a second light source package positioned between the display panel and the first backlight unit and a second light guide plate disposed at one side of the second light source package, the second backlight unit configured to generate second light,
wherein the second light guide plate includes second patterns protruding from a rear surface of the second light guide plate, the second patterns having an asymmetric pyramid shape having a first inclined surface and a second inclined surface that is steeper than the first inclined surface,
wherein the second light source package is disposed adjacent to the first inclined surface of the second patterns,
wherein during a first mode of the display device the first light source package is turned on to enable the first backlight unit and the second light source package is turned off to disable the second backlight unit such that the first light is emitted at a narrow angle in a front direction of the display panel by the first pattern and the first inclined surface of the second pattern; and
wherein during a second mode of the display device the first light source package is turned on to enable the first backlight unit and the second light source package is turned on to enable the second backlight unit such that the second light is further emitted to a side by the second inclined surface of the second pattern.

11. The display device according to claim 10, wherein among four sides of the asymmetric pyramid shape of each of the second patterns, an angle between a first side distant from the second light source package and the rear surface of the second light guide plate is greater than an angle between a second side that is closer to the second light source package and the rear surface of the second light guide plate.

12. The display device according to claim 11, wherein the first light guide plate includes first patterns protruding from a rear surface of the first light guide plate, the first patterns having a symmetric pyramid shape or a dot shape.

13. The display device according to claim 12, wherein during the first mode, the first light emitted from the first light source package is guided to a lower surface of the second light guide plate by an inclined surface or curved surface of the first patterns, and
the first light incident on the lower surface of the second light guide plate is refracted at a second side of the second patterns, the refracted first light emitted in an upper direction substantially perpendicular to an upper surface of the second light guide plate, and a lateral viewing angle of the display panel is limited in the first mode.

14. The display device according to claim 13, wherein during the second mode, the second light emitted from the second light source package is refracted at a first side of the second patterns so that at least a portion of the refracted second light is laterally emitted with respect to an upper surface of the second light guide plate, and a lateral viewing angle of the display panel is increased during the second mode.

15. The display device according to claim 14, wherein the first mode is a private mode, and the second mode is a share mode.

\* \* \* \* \*